US012663129B1

(12) United States Patent
Pan

(10) Patent No.: US 12,663,129 B1
(45) Date of Patent: Jun. 23, 2026

(54) WATER PUMPING AND SWINGING ORNAMENT STRUCTURE WITH MAGNETIC COUPLING DUAL-DRIVE SWINGING FUNCTION

(71) Applicant: HUIZHOU DICHENG ELECTRONIC TECHNOLOGY CO., LTD, Guangdong (CN)

(72) Inventor: Binjie Pan, Huizhou City (CN)

(73) Assignee: HUIZHOU DICHENG ELECTRONIC TECHNOLOGY CO., LTD, Huizhou City (CN)

( * ) Notice: Subject to any disclaimer, the term of this patent is extended or adjusted under 35 U.S.C. 154(b) by 0 days.

(21) Appl. No.: 19/246,757

(22) Filed: Jun. 24, 2025

(51) Int. Cl.
*F21S 10/00* (2006.01)
*F21W 121/00* (2006.01)

(52) U.S. Cl.
CPC ........ *F21S 10/002* (2013.01); *F21W 2121/00* (2013.01)

(58) Field of Classification Search
CPC .......................... F21S 10/002; F21W 2121/00
See application file for complete search history.

(56) References Cited

U.S. PATENT DOCUMENTS 6,379,124 B1 * 4/2002 Lai ........................ F21S 10/007 362/101
6,746,131 B1 * 6/2004 Goldstein ............. F21S 10/002 362/86
10,670,209 B1 * 6/2020 Guo ...................... F21S 10/063
2009/0135586 A1 * 5/2009 Yang ......................... F21V 9/12 362/101
2014/0268661 A1 * 9/2014 Yang ..................... F21S 10/002 362/101
2023/0167955 A1 * 6/2023 Yang ................... F21V 33/0012 362/101
2024/0382021 A1 * 11/2024 Pan ....................... F21S 10/002

FOREIGN PATENT DOCUMENTS

CN 101280946 A * 10/2008 ................ F24F 6/02
CN 103292405 A * 9/2013 ................ F24F 6/02
CN 204048348 U 12/2014

* cited by examiner

*Primary Examiner* — Tsion Tumebo
(74) *Attorney, Agent, or Firm* — Leong C. Lei

(57) ABSTRACT

A water pumping and swinging ornament structure with a magnetic coupling dual-drive swinging function includes a water lamp body, a decorative member, and a base. The water lamp body has a hollow main body and a light-transmissive bottom cap provided with a magnetic actuator. The decorative member is disposed inside the hollow main body, the bottom of the decorative member is connected to the bottom cap via a flexible cord, and a magnetic attraction piece is provided at the bottom of the bottom of the decorative member. The base is fixedly connected to the bottom of the water lamp body. The base is internally provided with a first drive unit having an output end connected to the magnetic actuator disposed corresponding to the bottom of the bottom cap; and a second drive unit connected to a swinging component, the swinging component being disposed corresponding to the magnetic attraction piece.

10 Claims, 3 Drawing Sheets

WATER PUMPING AND SWINGING ORNAMENT STRUCTURE WITH MAGNETIC COUPLING DUAL-DRIVE SWINGING FUNCTION

TECHNICAL FIELD

The present invention relates to the technical field of handicrafts, particularly to a water pumping and swinging ornament structure with a magnetic coupling dual-drive swinging function.

BACKGROUND

Generally, decorative ornaments commonly placed on desktops in daily life are nothing more than photo frames, toy ornaments, and the like, where these ornaments primarily serve a static function for aesthetic appreciation. Consequently, water lamp designs with internal sequins, glitter, or decorative members have emerged on the market. These designs utilize manual inversion and shaking or electric power to create a visual sensation of liquid movement with the internal sequins, glitter, or decorative members, providing expandable space and enabling a variety of visual effects or developments with multifunctionality and entertainment value. However, such water lamp designs are all intended to present internal dynamic effects.

In the prior art, the decorative members inside water lamp ornaments are generally designed to rotate or swing left and right, providing users with a visual experience through rotation or swinging. However, for water lamp ornaments with swinging decorative members, such as the approved Chinese patent No. CN2014203449215, although swinging is possible, the swing amplitude of the decorative member cannot be too fast. This prevents faster and more effective agitation of the sequins or glitter inside the water lamp ornament, resulting in poor practicality and an inability to meet market demands.

In view of this, the creator, leveraging years of experience in researching decorative ornaments, conceived and designed a structure that enables the decorative member to swing left and right while also quickly agitating the sequins or glitter inside the water lamp ornament to flow. This enhances the ornament's aesthetic appeal and practicality, leading to the creation of the present invention.

SUMMARY

An objective of the present invention is to provide a water pumping and swinging ornament structure with a magnetic coupling dual-drive swinging function that enhances visual perception and offers improved practicality.

To address the above technical problems, the present invention can be implemented using the following technical solutions:

A water pumping and swinging ornament structure with a magnetic coupling dual-drive swinging function, including:

- a water lamp body having a hollow main body and a bottom cap sealing an opening at the bottom of the hollow main body, the hollow main body being filled with a liquid;
- a decorative member disposed inside the hollow main body, where the bottom of the decorative member is connected to the bottom cap via a flexible cord, and a magnetic attraction piece is provided at the bottom of the decorative member; and

- a base fixedly connected to the bottom of the water lamp body, the base being internally provided with:
- a first drive unit having an output end connected to a magnetic actuator, the magnetic actuator being disposed corresponding to the bottom of the bottom cap; and
- a second drive unit connected to a swinging component, the swinging component being disposed corresponding to the magnetic attraction piece;
- where the first drive unit drives the magnetic actuator to rotate to cause magnetic field variation and agitate the liquid;
- the second drive unit drives the swinging component to flip, resulting in attraction or repulsion in a manner of magnetic coupling so that the decorative member creates a visual swinging effect in the liquid; and the swinging of the decorative member is limited by the length and tension of the flexible cord, so that the motion amplitude of the decorative member is predictable and stable.

In an embodiment, the first drive unit is a brushless motor or a brushed motor.

In an embodiment, an output terminal of the first drive unit is provided with a magnetic element, the first drive unit drives the magnetic element to rotate, and the magnetic actuator rotates under magnetic action to agitate the liquid in the water lamp body.

In an embodiment, the second drive unit includes a motor and a reduction gear disc, an output terminal of the motor is connected to the reduction gear disc via a transmission belt, the swinging component is connected to the reduction gear disc, and the motor drives the reduction gear disc to rotate via the transmission belt so that the swinging component flips up and down.

In an embodiment, at least one set of reduction gear discs are provided, and when multiple sets of reduction gear discs are provided, the reduction gear discs are sequentially connected via the transmission belt.

In an embodiment, the bottom cap is provided with a groove, the magnetic actuator is loaded in the groove, and the magnetic actuator is limited by a cover.

In an embodiment, the base is further provided with an electronic control unit, the first drive unit and the second drive unit are both electrically connected to the electronic control unit, and the electronic control unit is further electrically connected to a light-emitting element.

In an embodiment, two ends of the flexible cord are each provided with an embedded member, the embedded member at one end is embedded in the decorative member, and the embedded member at the other end is embedded in the bottom cap.

In an embodiment, the flexible cord is made of a flexible plastic material.

In an embodiment, sequins or glitter is selectively added to the liquid in the water lamp body.

The beneficial effects are as follows.

The water pumping and swinging ornament structure with a magnetic coupling dual-drive swinging function of the present invention employs the cooperation of the first drive unit and the magnetic actuator, enabling the magnetic actuator to agitate the liquid inside the water lamp body, thereby causing the sequins or glitter in the liquid to flow rapidly. Simultaneously, through the cooperation of the second drive unit and the magnetic attraction piece, the decorative member inside the water lamp body can be driven to swing left and right. The swinging of the decorative member also drives the flow of sequins or glitter in the liquid. Ultimately, the combination of the water pumping of the magnetic actuator and the swinging of the decorative member can better agitate the sequins or glitter, enhancing the practicality and aesthetic appeal of the water lamp ornament.

Figure 1:
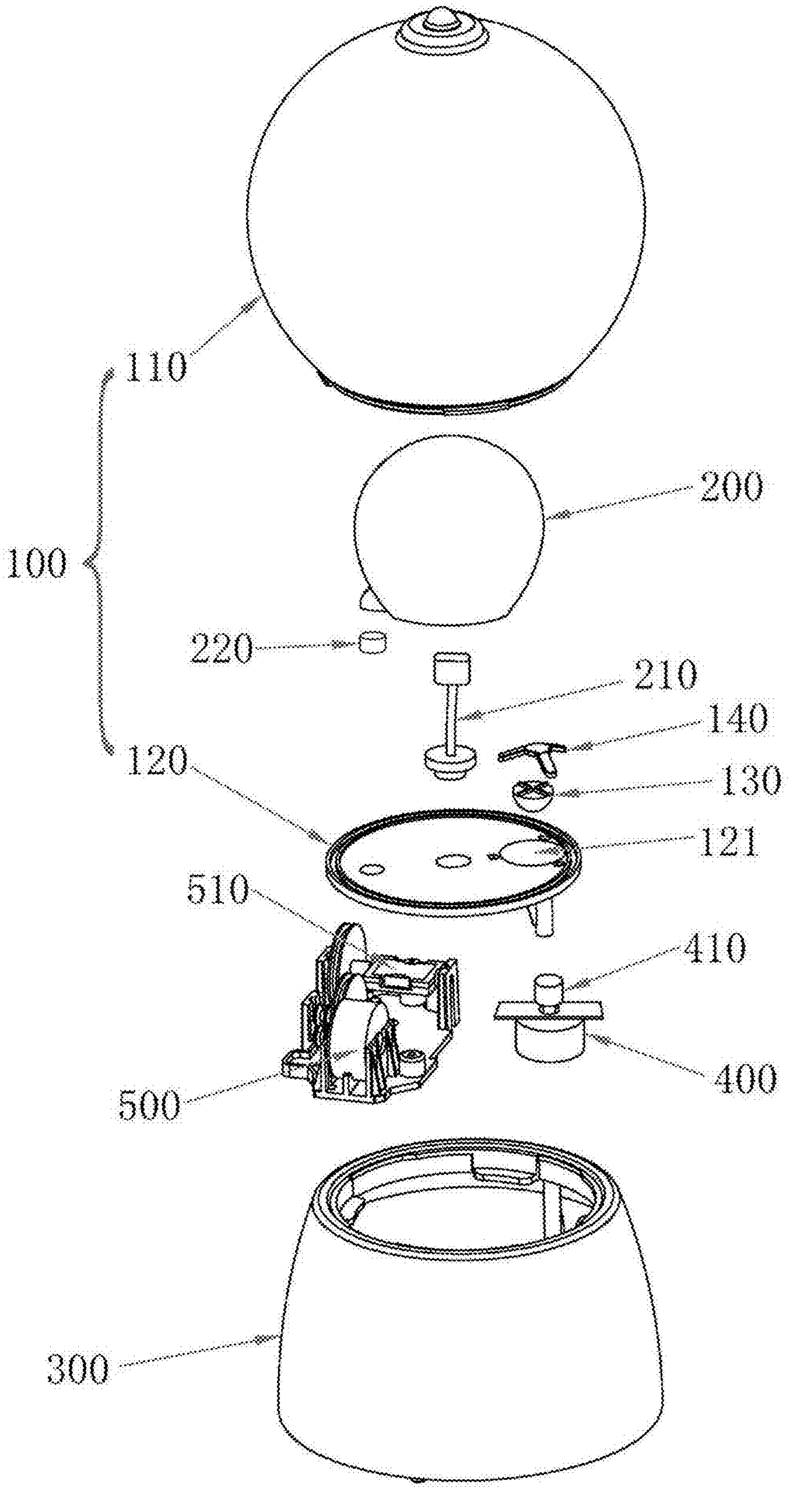
FIG. 1 is an exploded diagram of a water pumping and swinging ornament structure with a magnetic coupling dual-drive swinging function according to the present invention.

100, water lamp body; 110, hollow main body; 120, bottom cap; 121, groove; 130, magnetic actuator; 140, cover;

200, decorative member; 210, flexible cord; 211, embedded member; 220, magnetic attraction piece;

300, base; 310, electronic control unit; 320, light-emitting element;

400, first drive unit; 410, magnetic element;

500, second drive unit; 510, swinging component; 520, motor; 530, reduction gear disc; 540, transmission belt.

DETAILED DESCRIPTION

To make the above objectives, features, and advantages of the present invention more apparent and understandable, the specific implementations of the present invention are described in detail below with reference to the drawings. In the following description, numerous specific details are provided to facilitate a thorough understanding of the present invention. However, the present invention can be implemented in many ways different from those described here. Those skilled in the art can make similar improvements without departing from the spirit of the present invention. Thus, the present invention is not limited by the specific embodiments disclosed below.

It should be noted that when an element is referred to as being "fixed to" another element, it may be directly on the another element or there may also be an intervening element. When an element is considered to be "connected" to another element, it can be directly connected to the another element or there may simultaneously be an intervening element. Conversely, when an element is referred to as being "directly on" another element, there is no intervening element. The terms "vertical," "horizontal," "left," "right," and similar expressions used herein are for illustrative purposes only.

Unless otherwise defined, all technical and scientific terms used herein have the same meaning as commonly understood by those skilled in the technical field of the present invention. The terms used in the specification of the present invention herein are solely for the purpose of describing specific implementations and are not intended to limit the present invention. The term "and/or" as used herein includes any and all combinations of one or more of the related listed items.

Referring to FIGS. 1 to 4, a water pumping and swinging ornament structure with a magnetic coupling dual-drive swinging function includes:

a water lamp body 100 having a hollow main body 110 and a bottom cap 120 sealing an opening at the bottom of the hollow main body 110, the hollow main body 110 being filled with a internally contains a liquid;

a decorative member 200 disposed inside the hollow main body 110, where the bottom of the decorative member is connected to the bottom cap 120 via a flexible cord 210, and a magnetic attraction piece 220 is provided at the bottom of the decorative member 200; and a base 300 fixedly connected to the bottom of the water lamp body 100, the base 300 being internally provided with:

a first drive unit 400 having an output end connected to a magnetic actuator 130, the magnetic actuator 130 being disposed corresponding to the bottom of the bottom cap 120; and a second drive unit 500 connected to a swinging component 510, the swinging component 510 being disposed corresponding to the magnetic attraction piece 220.

Specifically, in this embodiment, the water lamp body 100 can be filled with liquid, which is sealed and covered by the bottom cap 120. The decorative member 200 inside the water lamp body 100 is supported by the buoyancy of the liquid and the flexible cord 210. Additionally, sequins or glitter is selectively added to the liquid. When the first drive unit 400 is activated, the first drive unit 400 can drive the magnetic actuator 130 to rotate, thereby agitating the liquid inside the water lamp body 100. Simultaneously, the second drive unit 500 is activated, and the second drive unit 500 drives the swinging component 510 to flip up and down. As the swinging component 510 flips up and down, the magnetic attraction piece 220 causes the decorative member 200 to swing left and right due to attraction or repulsion, thereby creating a visual swinging effect for the decorative member 200. Moreover, as the decorative member 200 swings, it can agitate the sequins or glitter in the liquid of the water lamp body 100. Combined with the first drive unit 400 driving the magnetic actuator 130 to agitate the liquid, this enables the sequins or glitter to be rapidly stirred, thereby enhancing the practicality and aesthetic appeal of the water lamp ornament.

Additionally, to facilitate the connection of the two ends of the flexible cord 210 to the decorative member 200 and the bottom cap 120, respectively, and to ensure that the decorative member 200 can swing left and right, embedded members 211 are provided at both ends of the flexible cord 210. The embedded member at one end of the flexible cord 210 is embedded in the lower part of the decorative member 200, while the embedded member 211 at the other end is embedded in the bottom cap 120. The flexible cord 210 may be made of a flexible plastic material, enabling the magnetic attraction piece 220 of the decorative member 200 to produce a visual swinging effect under a magnetized state.

The decorative member 200 is a three-dimensional shape, which may take the form of figures, animals, plants, handicrafts, or the like, without limitation herein. The first drive unit 400 is a brushless motor or a brushed motor. Certainly, the first drive unit 400 is not limited to these and may also be other motors with the same function.

Furthermore, to drive the operation of the first drive unit 400 and the second drive unit 500 and enhance the visual perception of the water lamp ornament, an electronic control unit 310 is provided in the base 300 in this embodiment. The electronic control unit 310 is electrically connected to both the first drive unit 400 and the second drive unit 500.

Additionally, the electronic control unit 310 is also electrically connected to a light-emitting element 320. The electronic control unit 310 supplies power to the first drive unit 400 and the second drive unit 500 and controls the first drive unit 400 and the second drive unit 500, enabling the first drive unit 400 to drive the magnetic actuator 130 to rotate and the second drive unit 500 to drive the swinging component 510 to flip up and down The electronic control unit 310 can also drive the light-emitting element 320 to emit light, illuminating the water lamp body 100. This enables the water lamp body 100 to project vibrant and dazzling colors, thereby enhancing the visual effect for users.

Figure 2:
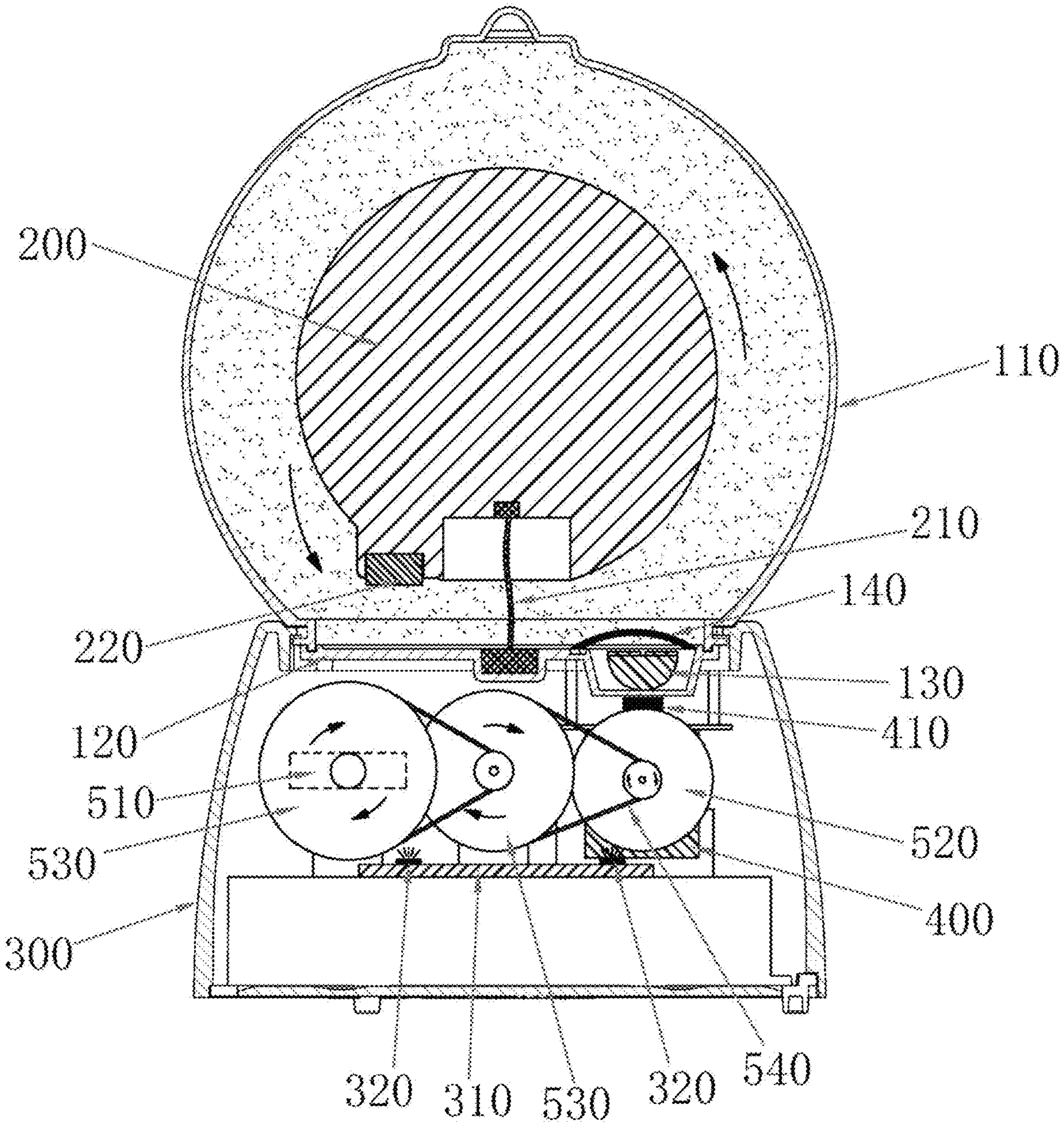
FIG. 2 is a sectional diagram of the water pumping and swinging ornament structure with a magnetic coupling dual-drive swinging function according to the present invention.

Referring to FIG. 1 or FIG. 2, to drive the magnetic actuator 130 inside the water lamp body 100 to rotate, a magnetic element 410 is provided at the output terminal of the first drive unit 400 in this embodiment. The first drive unit 400 drives the magnetic element 410 to rotate, and the magnetic actuator 130 rotates under the influence of the magnetic element 410, agitating the liquid inside the water lamp body 100. The first drive unit 400 is fixed to the bottom of the bottom cap 120 and connected to the electronic control unit 310. A magnetic element 410 corresponding to the magnetic actuator 130 is provided at the output terminal of the first drive unit 400. The first drive unit 400 drives the magnetic element 410 to rotate, and through magnetic principles, it drives the magnetic actuator 130 inside the water lamp body 100 to rotate. As the magnetic actuator 130 rotates, it agitates the liquid inside the water lamp body 100, enabling the sequins or glitter in the liquid to be rapidly stirred; To better enable magnetic cooperation between the magnetic element 410 and the magnetic actuator 130, both the magnetic element 410 and the magnetic actuator 130 are made of magnets.

To facilitate the placement of the magnetic actuator 130 inside the water lamp body 100, a groove 121 is provided in the bottom cap 120. The magnetic actuator 130 is loaded into the groove 121, and after loading, the magnetic actuator 130 is restrained by a cover 140 to prevent the magnetic actuator 130 from escaping the groove 121. This ensures a reasonable structural design between the first drive unit 400 and the magnetic actuator 130.

Figure 3:
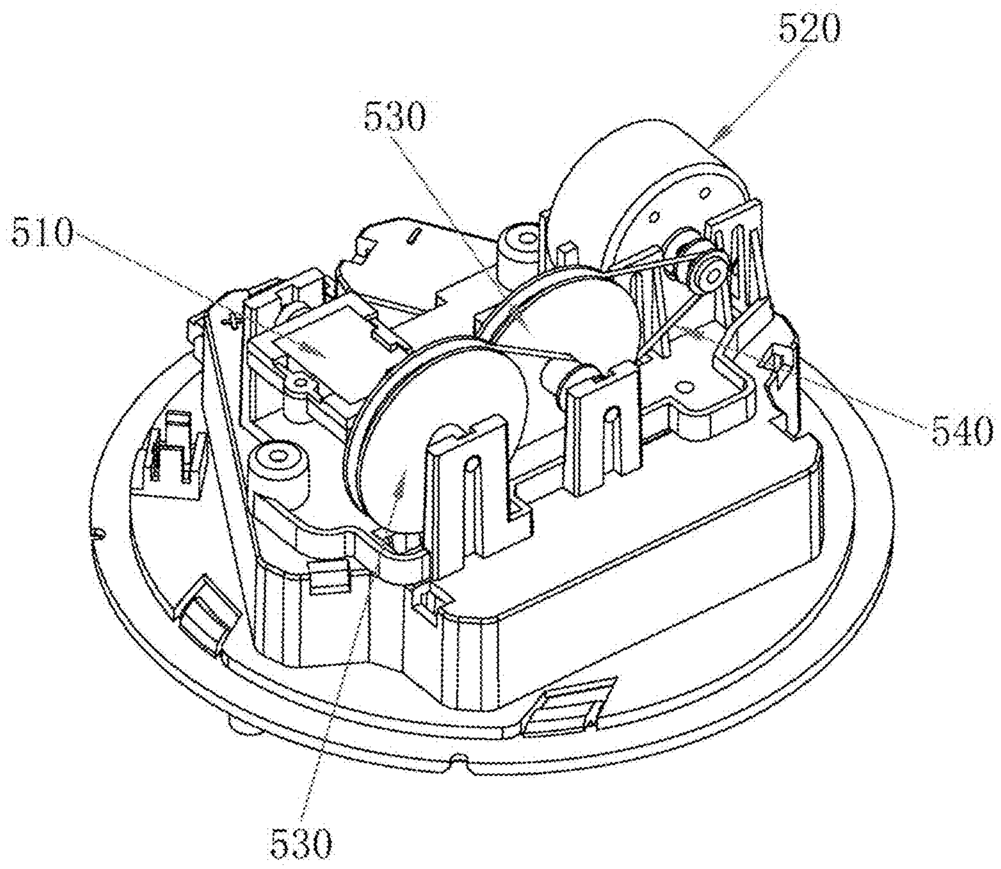
FIG. 3 is a schematic diagram of a second drive unit of the water pumping and swinging ornament structure with a magnetic coupling dual-drive swinging function according to the present invention.
Figure 4:
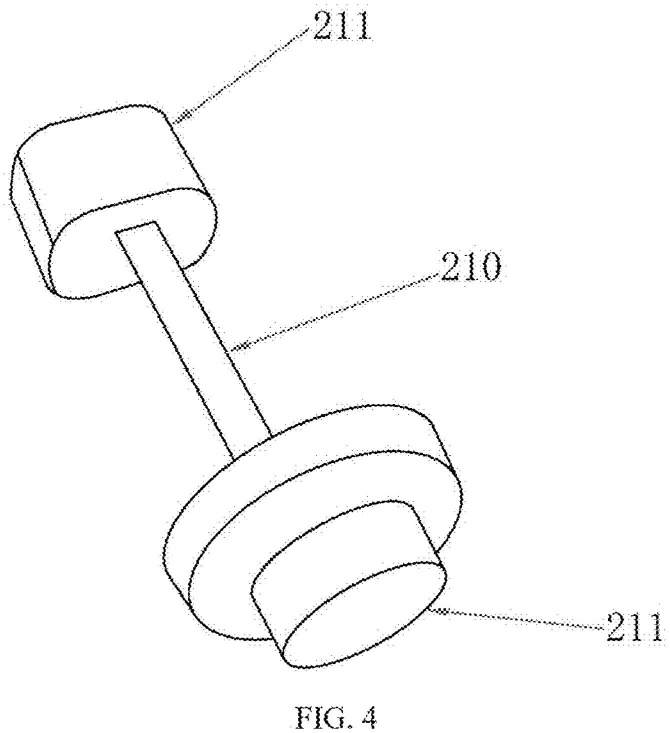
FIG. 4 shows a flexible cord of the water pumping and swinging ornament structure with a magnetic coupling dual-drive swinging function according to the present invention.

Referring to FIG. 2 and FIG. 3, to drive the decorative member 200 inside the water lamp body 100 to swing left and right, the second drive unit 500 in this embodiment includes a motor 520 and a reduction gear disc 530. The output terminal of the motor 520 is connected to the reduction gear disc 530 via a transmission belt 540, and the swinging component 510 is connected to the reduction gear disc 530. The motor 520 drives the reduction gear disc 530 to rotate via the transmission belt 540, causing the swinging component 510 to flip up and down. The control unit 310 drives the motor 520 to operate. During operation, the output terminal of the motor 520 drives the reduction gear disc 530 to rotate via the transmission belt 540. As the reduction gear disc 530 rotates, it causes the swinging component 510 to flip up and down. The magnetic attraction piece 220 of the decorative member 200 produces a visual swinging effect under a magnetized state. Additionally, the reduction gear disc 530 effectively reduces the speed of the vertical flipping of the swinging component 510, preventing excessively fast swinging of the decorative member 200 left and right due to overly rapid flipping.

Certainly, to ensure the reduction effect, at least one set of reduction gear discs 530 are provided, and the number of sets may be set based on actual needs. When multiple sets of reduction gear discs 530 are provided, the multiple reduction gear discs 530 may be sequentially connected via the transmission belt 540. This allows the motor 520 to drive the multiple reduction gear discs 530 to rotate, causing the swinging component 510 to flip up and down, achieving the reduction effect.

Similarly, to better enable cooperation between the swinging component 510 and the magnetic attraction piece 220, both the swinging component 510 and the magnetic attraction piece 220 are made of magnets.

In an embodiment, the first drive unit is a brushless motor or a brushed motor.

In an embodiment, an output terminal of the first drive unit is provided with a magnetic element, the first drive unit drives the magnetic element to rotate, and the magnetic actuator rotates under magnetic action to agitate the liquid in the water lamp body.

In an embodiment, the second drive unit includes a motor and a reduction gear disc, an output terminal of the motor is connected to the reduction gear disc via a transmission belt, the swinging component is connected to the reduction gear disc, and the motor drives the reduction gear disc to rotate via the transmission belt so that the swinging component flips up and down.

In an embodiment, at least one set of reduction gear discs are provided, and when multiple sets of reduction gear discs are provided, the reduction gear discs are sequentially connected via the transmission belt.

In an embodiment, the bottom cap is provided with a groove, the magnetic actuator is loaded in the groove, and the magnetic actuator is limited by a cover.

In an embodiment, the base is further provided with an electronic control unit, the first drive unit and the second drive unit are both electrically connected to the electronic control unit, and the electronic control unit is further electrically connected to a light-emitting element.

In an embodiment, two ends of the flexible cord are each provided with an embedded member, the embedded member at one end is embedded in the decorative member, and the embedded member at the other end is embedded in the bottom cap.

In an embodiment, the flexible cord is made of a flexible plastic material.

In an embodiment, sequins or glitter is selectively added to the liquid in the water lamp body.

In an embodiment, a water pumping and swinging ornament structure with a magnetic coupling dual-drive swinging function is disclosed and is suitable for a water lamp, an indoor decorative lamp or a liquid display device with dynamic visual effects.

The structure comprises a water lamp body 100, which comprises a hollow main body 110 made of transparent plastic or glass, and a bottom cap 120 seals the bottom of the hollow main body 110 to form an accommodating space. The hollow main body 110 is filled with a flowable liquid which is selectively water or color, and water is stirred by the magnetic actuator 130 so as to be pumped, thereby producing a light refraction effect.

A decorative member 200 is disposed in the liquid of the hollow main body 110, and is preferably made of plastic, resin, or light metal which has a specific gravity that is suitable for floating in the liquid. A flexible cord 210 is connected to the bottom of the decorative member 200 and extends to the center of the bottom cap 121. The length of the flexible cord 210 limits the maximum swinging amplitude of the decorative member 200 in the liquid and maintains a stable movement track.

A magnetic attraction piece 220 is embedded in the bottom of the decorative member 200 and is preferably made of a neodymium magnet.

The structure further includes a base 300 disposed below the water lamp body 100, and two independent driving modules are disposed in the base 300:

A first drive unit 400, preferably a low-speed DC motor, where an output shaft of the first drive unit 400 is connected to a rotatable magnetic actuator 410, preferably to a disc-shaped magnet, which is disposed directly below the corresponding bottom cap 121 to form a magnetic field varying region through the bottom cap 121 and the liquid space. When the first drive unit 400 is activated, the magnetic actuator 410 rotates to pump the liquid, causing the liquid above to be stirred to generate a vortex, and applying a varying magnetic field to the magnetic attraction piece 220 at the bottom of the decorative member 200.

A second drive unit 500, preferably a stepping motor, which is connected to a swinging component 510 designed in the form of a rocker arm, a second magnetic element 220 corresponding to the position of the decorative member 200 being provided on the component 120. The second drive unit 500 can periodically or alternately drive the swinging component 510 to swing to form magnetic traction force and repulsive force, causing the decorative member 200 to swing left and right or back and forth in the liquid.

The magnetic coupling device enables the decorative member 200 to achieve predictable and visually interesting swinging effects without direct mechanical linkage. The flexible cord 211 provides moderate restraint and damping, allowing the decorative member 200 to swing in a consistent rhythm and stable visual pattern without excessive drift.

In addition, the structure may be further equipped and combined with a light-emitting module and an induction control device so that the whole water lamp device becomes more interactive and decorative.

The above illustrates and describes the basic principles, main features, and advantages of the present invention. All skilled persons in this industry can smoothly implement the present invention as shown in the accompanying drawings of the specification and as described above; However, any minor alterations, modifications, or evolutions made by those skilled in the art using the technical content disclosed above, within the scope of the technical solutions of the present invention, are considered equivalent embodiments of the present invention. Moreover, any alterations, modifications, or evolutions based on the essential technology of the present invention that result in equivalent changes to the above embodiments still fall within the protection scope of the technical solutions of the present invention.

What is claimed is:

1. A water pumping and swinging ornament structure with a magnetic coupling dual-drive swinging function, comprising:

a water lamp body having a hollow main body and a bottom cap sealing an opening at the bottom of the hollow main body, the hollow main body being filled with a liquid;

a decorative member disposed inside the hollow main body, wherein the bottom of the decorative member is connected to the bottom cap via a flexible cord, and a magnetic attraction piece is provided at the bottom of the decorative member; and a base fixedly connected to the bottom of the water lamp body, the base being internally provided with:

a first drive unit having an output end connected to a magnetic actuator, the magnetic actuator being disposed corresponding to the bottom of the bottom cap; and a second drive unit connected to a swinging component, the swinging component being disposed corresponding to the magnetic attraction piece;

wherein the first drive unit drives the magnetic actuator to rotate to cause magnetic field variation and agitate the liquid;

the second drive unit drives the swinging component to flip, resulting in attraction or repulsion in a manner of magnetic coupling so that the decorative member creates a visual swinging effect in the liquid; and the swinging of the decorative member is limited by the length and tension of the flexible cord, so that the motion amplitude of the decorative member is predictable and stable.

2. The water pumping and swinging ornament structure with a magnetic coupling dual-drive swinging function according to claim 1, wherein the first drive unit is a brushless motor or a brushed motor.

3. The water pumping and swinging ornament structure with a magnetic coupling dual-drive swinging function according to claim 1, wherein an output terminal of the first drive unit is provided with a magnetic element, the first drive unit drives the magnetic element to rotate, and the magnetic actuator rotates under magnetic action to agitate the liquid in the water lamp body.

4. The water pumping and swinging ornament structure with a magnetic coupling dual-drive swinging function according to claim 1, wherein the second drive unit comprises a motor and a reduction gear disc, an output terminal of the motor is connected to the reduction gear disc via a transmission belt, the swinging component is connected to the reduction gear disc, and the motor drives the reduction gear disc to rotate via the transmission belt so that the swinging component flips up and down.

5. The water pumping and swinging ornament structure with a magnetic coupling dual-drive swinging function according to claim 4, wherein at least one set of reduction gear discs are provided, and when multiple sets of reduction gear discs are provided, the reduction gear discs are sequentially connected via the transmission belt.

6. The water pumping and swinging ornament structure with a magnetic coupling dual-drive swinging function according to claim 1, wherein the bottom cap is provided with a groove, the magnetic actuator is loaded in the groove, and the magnetic actuator is limited by a cover.

7. The water pumping and swinging ornament structure with a magnetic coupling dual-drive swinging function according to claim 1, wherein the base is further provided with an electronic control unit, the first drive unit and the second drive unit are both electrically connected to the electronic control unit, and the electronic control unit is further electrically connected to a light-emitting element.

8. The water pumping and swinging ornament structure with a magnetic coupling dual-drive swinging function according to claim 1, wherein two ends of the flexible cord are each provided with an embedded member, the embedded member at one end is embedded in the decorative member, and the embedded member at the other end is embedded in the bottom cap.

9. The water pumping and swinging ornament structure with a magnetic coupling dual-drive swinging function according to claim 8, wherein the flexible cord is made of a flexible plastic material.

10. The water pumping and swinging ornament structure with a magnetic coupling dual-drive swinging function according to claim 1, wherein sequins or glitter is selectively added to the liquid in the water lamp body.

* * * * *